United States Patent
Robertson

(10) Patent No.: US 7,027,175 B2
(45) Date of Patent: Apr. 11, 2006

(54) PRINT PROCESSING SYSTEM AND METHOD WITH PRINT JOB REPROCESSING

(75) Inventor: Melanie M. Robertson, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 441 days.

(21) Appl. No.: 09/999,527

(22) Filed: Nov. 15, 2001

(65) Prior Publication Data

US 2003/0093325 A1    May 15, 2003

(51) Int. Cl.
*G06F 15/00*    (2006.01)

(52) U.S. Cl. .................. 358/1.15; 358/402; 709/203

(58) Field of Classification Search .................. 705/27; 358/1.13, 1.15, 402; 709/203, 223
See application file for complete search history.

(56) References Cited

U.S. PATENT DOCUMENTS

| | | | | |
|---|---|---|---|---|
| 5,130,806 A | * | 7/1992 | Reed et al. .................. 358/296 |
| 5,467,434 A | * | 11/1995 | Hower et al. ............... 358/1.15 |
| 5,963,941 A | * | 10/1999 | Hirakawa ....................... 707/5 |
| 5,970,475 A | | 10/1999 | Barnes et al. |
| 6,330,542 B1 | * | 12/2001 | Sevcik et al. .................. 705/8 |
| 6,349,134 B1 | * | 2/2002 | Katz ........................ 379/92.01 |
| 6,415,277 B1 | * | 7/2002 | Klatt et al. .................... 707/1 |
| 6,449,346 B1 | * | 9/2002 | Katz ........................ 379/93.12 |
| 6,482,156 B1 | * | 11/2002 | Iliff ............................ 600/300 |
| 6,639,687 B1 | * | 10/2003 | Neilsen ...................... 358/1.14 |
| 6,650,433 B1 | * | 11/2003 | Keane et al. ............... 358/1.15 |
| 6,894,795 B1 | * | 5/2005 | Simpson et al. ........... 358/1.15 |
| 2002/0078012 A1 | * | 6/2002 | Ryan et al. .................... 707/1 |
| 2002/0082909 A1 | * | 6/2002 | Hobbs ......................... 705/14 |

FOREIGN PATENT DOCUMENTS

WO    WO 00/003342    1/2000

* cited by examiner

*Primary Examiner*—Andrew Joseph Rudy

(57) ABSTRACT

A system and method of reprocessing a print job of a user includes processing of the print job by a print provider based on a job ticket and a data file for the print job, soliciting and receiving an offer by at least one print provider, including the print provider, to reprocess the print job, and notifying the user of the offer by the at least one print provider to reprocess the print job.

11 Claims, 8 Drawing Sheets

PRINT PROCESSING SYSTEM AND METHOD WITH PRINT JOB REPROCESSING

CROSS-REFERENCE TO RELATED APPLICATIONS

This patent application is related to Non-Provisional U.S. patent application Ser. No. 09/685,847, entitled "INTERNET PRINT MANAGING SYSTEM AND METHOD WITH PRINT JOB DISTRIBUTION", filed on Oct. 10, 2000, assigned to the assignee of the present invention, and incorporated herein by reference; and Non-Provisional U.S. patent application Ser. No. 09/686,849, entitled "INTERNET PRINT BROKERING SYSTEM AND METHOD", filed on Oct. 10, 2000, assigned to the assignee of the present invention, and incorporated herein by reference.

THE FIELD OF THE INVENTION

The present invention relates generally to print services and, more particularly to a system and method of processing and reprocessing a print job of a user.

BACKGROUND OF THE INVENTION

Typically, a party having printing needs must either fulfill the printing needs on their own or contract with a print provider offering printing services to fulfill the printing needs. Before contracting with a print provider, however, a customer or user must identify which print providers offer specific printing services which can fulfill the printing needs. Identifying which print providers of a myriad of available print providers provide specific printing services is a tedious task. More specifically, the customer must contact each print provider individually, either in person or telephonically, to identify which print providers provide specific printing services which can fulfill the printing needs.

While identifying which print providers provide specific printing services, the customer also must identify which print providers provide specific printing services within desired or necessary parameters. The customer may require, for example, that a print job be completed and delivered within a certain time frame or that a print job be completed for less than a specific price. Thus, a customer may need to contact several print providers individually to identify which print providers provide specific printing services within desired or necessary parameters.

Unfortunately, contacting several print providers individually to identify which print providers provide specific printing services within desired or necessary parameters is often ineffective and inefficient. After contacting several print providers, for example, the customer may find that the print providers do not provide the specific printing services or that the print providers do not provide the specific printing services within the desired or necessary parameters. Thus, efforts of the customer may identify few or no print providers capable of fulfilling the print job. However, once the customer does identify one or more print providers which are capable of fulfilling the print job and, therefore, establishes a relationship with a print provider by having the print provider process the print job, the customer and/or the print provider may wish to repeat business, including reprocessing of the print job, and recognize or honor the established relationship.

Accordingly, a need exists for efficiently and effectively facilitating subsequent reprocessing of a print job between a customer or user and a plurality of print providers after at least one of the print providers has initially processed the print job. More specifically, a need exists for generating repeat business between the customer and one or more of the print providers.

SUMMARY OF THE INVENTION

One aspect of the present invention provides a method of reprocessing a print job of a user. The method includes processing of the print job by a print provider based on a job ticket and a data file for the print job, soliciting and receiving an offer by at least one print provider, including the print provider, to reprocess the print job, and notifying the user of the offer by the at least one print provider to reprocess the print job.

Another aspect of the present invention provides a system for reprocessing a print job of a user. The system includes a print processing system controller configured to have print services of a print provider registered therewith, and a print job reprocessing system associated with the print processing system controller. As such, the print processing system controller is adapted to receive a job ticket and a data file for the print job and the print provider is adapted to process the print job with the print services based on the job ticket and the data file for the print job. Thus, the print job reprocessing system is adapted to solicit and receive an offer by at least one print provider, including the print provider, to reprocess the print job and is adapted to notify the user of the offer by the at least one print provider to reprocess the print job.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
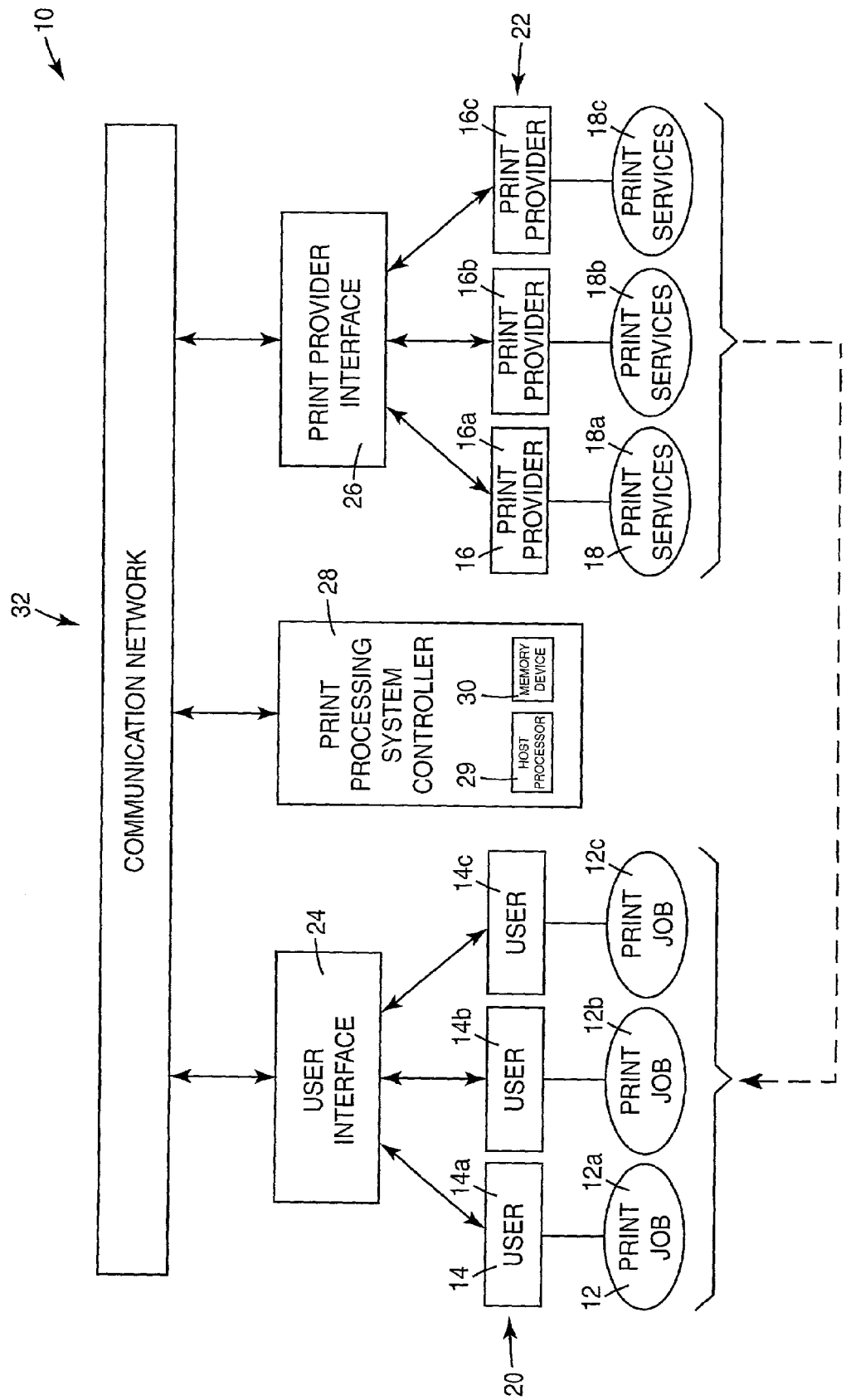
FIG. 1 is a block diagram illustrating one exemplary embodiment of a print processing system according to the present invention.

A print processing system according to the present invention is illustrated generally at 10 in FIG. 1. Print processing system 10 facilitates processing of a print job 12 of a user 14, including printing of print job 12 by a print provider 16 offering print services 18. In one exemplary embodiment, print processing system 10 facilitates reprocessing of print job 12. More specifically, print processing system 10 solicits and receives an offer by at least one print provider 16 to reprocess print job 12, notifies and receives from user 14 an acceptance of the offer to reprocess print job 12, and reprocesses print job 12 accordingly. Print job reprocessing according to the present invention is described in detail later in this application.

In one exemplary embodiment, print processing system 10 facilitates processing of a print job 12a, 12b, 12c of a user 14a, 14b, 14c, including printing of print job 12a, 12b, 12c by a print provider 16a, 16b, 16c offering print services 18a, 18b, 18c. For clarity, print job 12a, 12b, 12c, user 14a, 14b, 14c, print provider 16a, 16b, 16c, and print services 18a, 18b, 18c are referred to hereinafter as print job 12, user 14, print provider 16, and print services 18, respectively. As such, user 14 may be one of a plurality of users 20 each having a separate print job 12. Print provider 16 may be one of a plurality of print providers 22 each providing separate print services 18.

Print job 12, as used herein, is defined to include a piece of work requiring production and/or reproduction of printed matter. User 14, as used herein, is defined to include an entity or entities such as a customer, a consumer, an employee, or another print provider requesting or soliciting printing services, finishing services, delivery services, and/or other print processing services. User 14, therefore, includes any user of such printing, finishing, delivery, and/or other print processing services. Print provider 16, as used herein, is defined to include an entity or entities offering, providing, and/or assisting in printing services, finishing services, delivery services, and/or other print processing services. Print services 18, as used herein, is defined to include printing services, finishing services, delivery services, and/or other print processing services.

In one exemplary embodiment, print processing system 10 includes a user interface 24 and a print provider interface 26. As such, users 20 interact with user interface 24 and print providers 22 interact with print provider interface 26. It is within the scope of the present invention for multiple users 20 to each use the same user interface 24 and/or for each user 14 to have their own user interface 24. In addition, multiple print providers 22 may each use the same print provider interface 26 and/or each print provider 16 may have their own print provider interface 26.

Print processing system 10 includes a print processing system controller 28 which manages and/or coordinates processing of print job 12. More specifically, print processing system controller 28 registers print services 18 of print providers 22, receives print jobs 12 of users 20, and distributes print jobs 12 of users 20 to print providers 22, as described below. As such, print processing system controller 28 facilitates processing of print job 12.

Print processing system controller 28 includes hardware, software, firmware, or a combination of these. In one preferred embodiment, print processing system controller 28 includes a host processor 29. Host processor 29 can be or can be included in a computer server or other microprocessor based system capable of performing a sequence of logic operations. In addition, print processing system controller 28 can include a microprocessor embedded system/appliance incorporating tailored appliance hardware and/or dedicated single purpose hardware.

In one exemplary embodiment, print processing system controller 28 includes a memory device 30 which stores information for print processing system controller 28 and/or print processing system 10. Examples of memory device 28 include non-volatile memory (e.g., a hard disk drive or other persistent storage device) and may include volatile memory (e.g., random access memory (RAM)). Another example of memory device 30 may include a relational database management server (RDBMS). While memory device 30 is illustrated as being a part of print processing system controller 28, it is within the scope of the present invention for memory device 30 to be separate from print processing system controller 28.

Through user interface 24 and print provider interface 26, users 20 and print providers 22, respectively, and print processing system controller 28 communicate with each other via a communication network 32. More specifically, communications between users 20 and print processing system controller 28, communications between print providers 22 and print processing system controller 28, and communications between users 20 and print providers 22 are conducted over communication network 32. Communication network 32, as used herein, is defined to include a local-area network (LAN) and/or a wide-area network (WAN). Communication network 32, therefore, may include an intranet communication network, an Internet communication network, or similar high-speed communication network including a wireless communication network.

In one exemplary embodiment, users 20, print providers 22, and print processing system controller 28 are located remote from each other (i.e., at different locations). Thus, communications between users 20, print providers 22, and print processing system controller 28 are conducted over communication network 32. It is, however, within the scope of the present invention for users 20, print providers 22, and/or print processing system controller 28 to be located at the same location. Thus, users 20, print providers 22, and/or print processing system controller 28 may communicate in other manners (e.g., a direct connection or communication link).

Component of print processing system 10, including print processing system controller 28, can be implemented in hardware via a microprocessor, programmable logic device, or state machine, in firmware, or in software within a given device. In one embodiment, at least a portion of the software programming is written in JAVA programming language, and each of the main components communicate via communication network 32 using a communication bus protocol. For example, the present invention may or may not use a TCP/IP protocol suite for data transport. Other programming languages and communication bus protocols suitable for use with print processing system 10 will become apparent to those skilled in the art after reading the present application.

Figure 2:
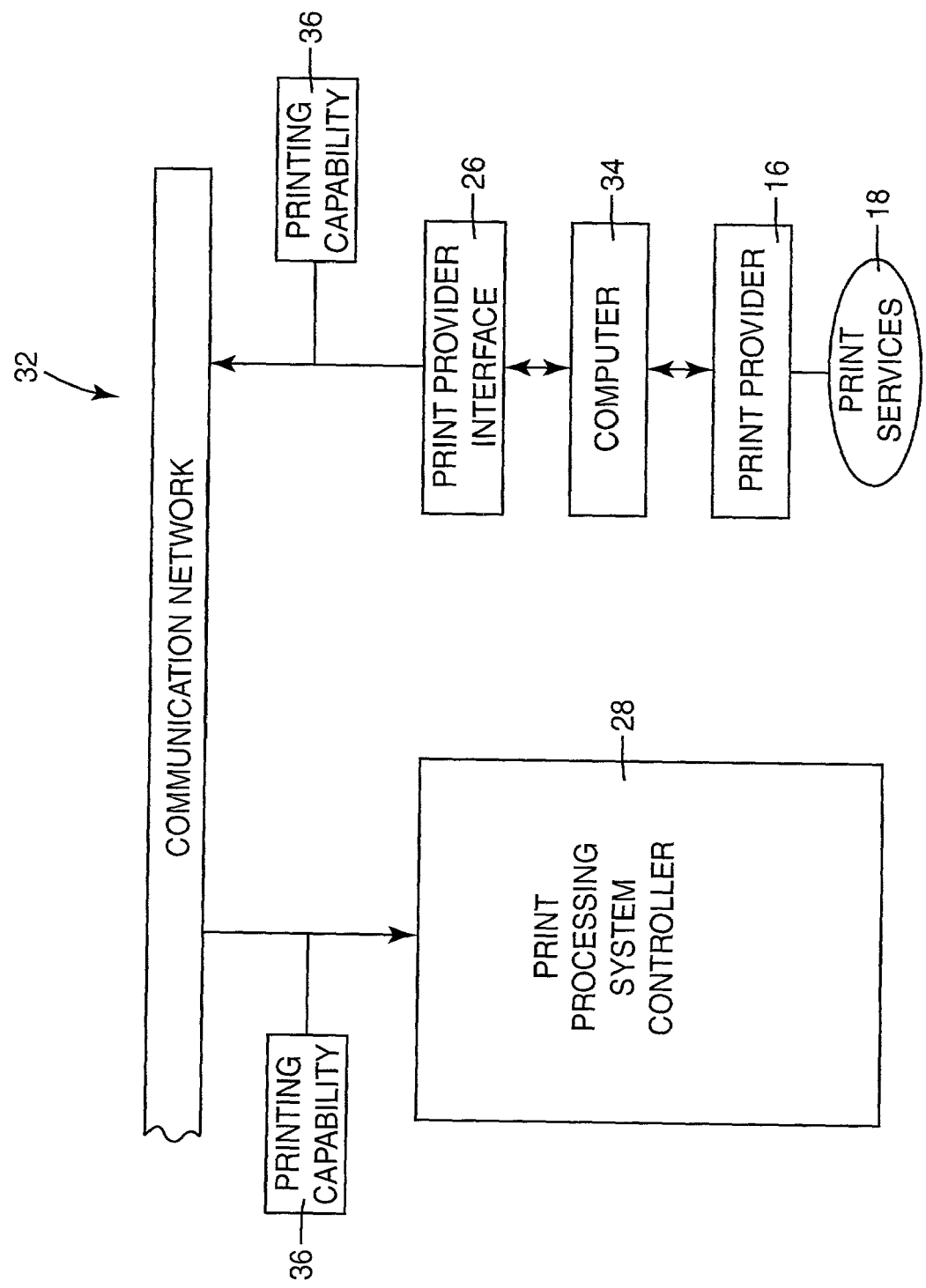
FIG. 2 is a block diagram illustrating one exemplary embodiment of information flow through a portion of the print processing system of FIG. 1.

As illustrated in FIG. 2, print provider 16 accesses print provider interface 26 of print processing system 10 via a computer 34. Computer 34 may include, for example, an input device such as a keyboard and/or a mouse and a display device such as a monitor, as is well known in the art. Computer 34 may be an appliance such as a personal digital assistant (PDA), scanner, camera, cellular phone, etc. In one exemplary embodiment, computer 34 runs an operating system which can support one or more applications. The operating system is stored in memory and executes on a processor. The operating system is preferably a multi-tasking operating system which allows simultaneous execution of multiple applications, although aspects of the present invention may be implemented using a single-tasking operating system.

In one exemplary embodiment, print provider 16 interacts with print provider interface 26 via computer 34 to register a printing capability 36 with print processing system controller 28 via communication network 32. Registration of printing capability 36, including re-registering and/or updating of printing capability 36, is described, for example, in above-incorporated U.S. patent application Ser. Nos. 09/685,847 and 09/686,849. Printing capability 36 identifies attributes of print services 18 provided by print provider 16, as described below.

In one exemplary embodiment, print processing system controller 28 communicates with and transfers printing capability 36 of print providers 22 to memory device 30 (FIG. 1). As such, memory device 30 stores printing capability 36 of print providers 22 for subsequent retrieval and processing. More specifically, when print processing system controller 28 receives printing capability 36 from print provider 16, printing capability 36 is stored as a data file in memory device 30. Print processing system controller 28, therefore, subsequently retrieves printing capability 36 from memory device 30 for processing.

Figure 3:
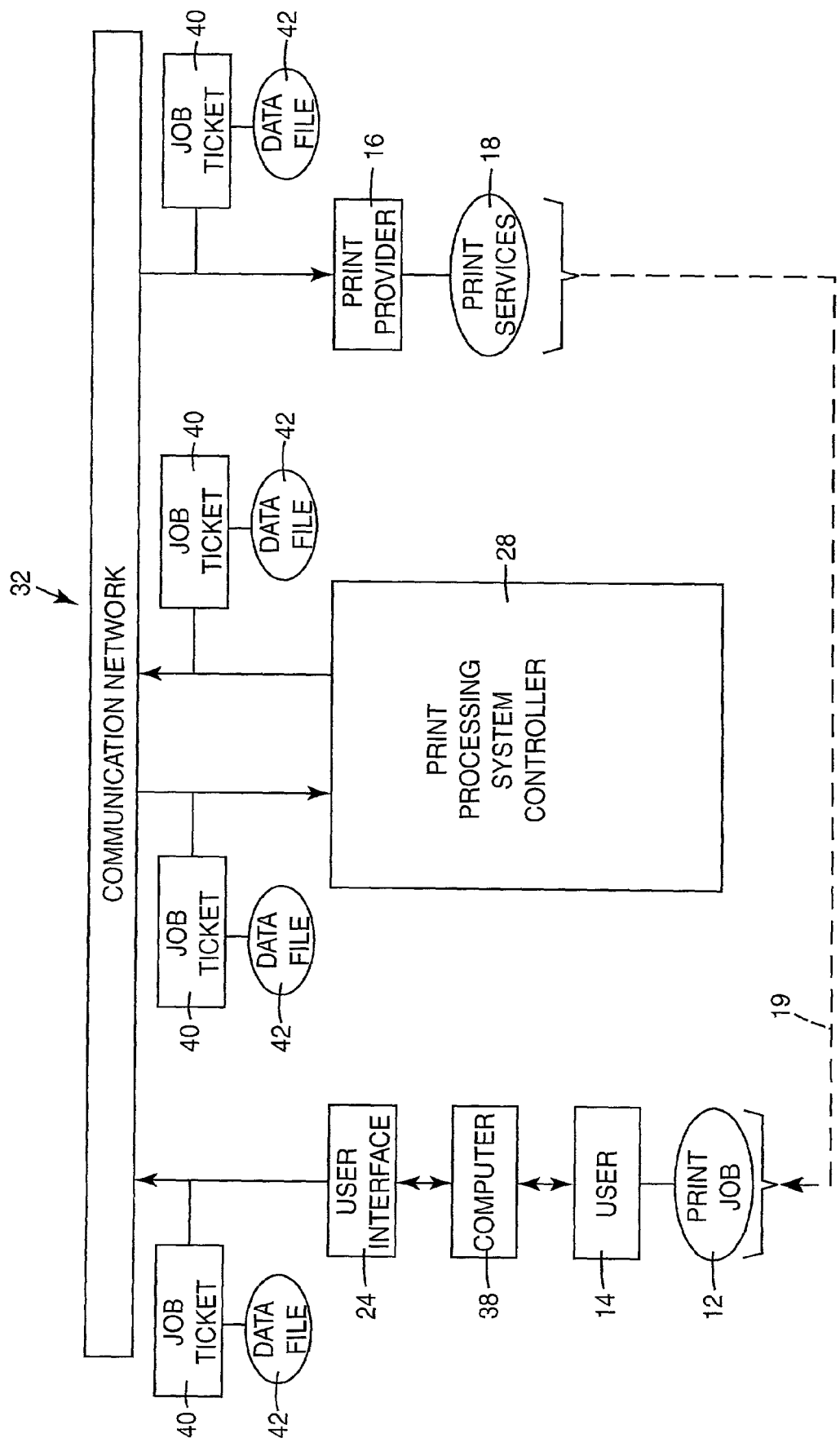
FIG. 3 is a block diagram illustrating another exemplary embodiment of information flow through the print processing system of FIG. 1.

As illustrated in FIG. 3, user 14 accesses user interface 24 of print processing system 10 via a computer 38. Computer 38 may include, for example, an input device such as a keyboard and/or a mouse and a display device such as a monitor, as is well known in the art. Computer 38 may be an appliance such as a personal digital assistant (PDA), scanner, camera, cellular phone, etc. In one exemplary embodiment, computer 38 runs an operating system which can support one or more applications. The operating system is stored in memory and executes on a processor. The operating system is preferably a multi-tasking operating system which allows simultaneous execution of multiple applications, although aspects of the present invention may be implemented using a single-tasking operating system.

In one exemplary embodiment, user 14 interacts with user interface 24 via computer 38 to generate a job ticket 40 for print job 12 and submit job ticket 40 to print processing system controller 28 via communication network 32. Generation and submission of job ticket 40, including tracking and/or redistribution of job ticket 40, is described, for example, in above-incorporated U.S. patent application Ser. Nos. 09/685,847 and 09/686,849. Job ticket 40 identifies attributes of print job 12 as specified, for example, by user 14. Job ticket 40, as used herein, is defined to include a list and/or a description of a piece of work requiring production and/or reproduction of printed matter. One exemplary embodiment of job ticket 40 is described in detail later in this application.

Print processing system controller 28 receives job ticket 40 from user 14, processes job ticket 40, and distributes job ticket 40 to print provider 16. Thus, print services 18 of print provider 16 interact with job ticket 40 to extract information for completing print job 12. As such, print provider 16 completes print job 12 and delivers completed print job 12 to user 14. Delivery of completed print job 12 to user 14 from print provider 16 is represented by dashed line 19.

In one exemplary embodiment, a data file 42 for print job 12 is associated with job ticket 40. Thus, data file 42 of print job 12 is submitted with job ticket 40 and uploaded to print processing system controller 28 via communication network 32. As such, print processing system controller 28 stores data file 42 of print job 12 in memory device 30 for subsequent downloading to print provider 16.

When print processing system controller 28 distributes job ticket 40 to print provider 16, print processing system controller 28 also distributes data file 42 to print provider 16. Data file 42, therefore, is downloaded from memory device 30 and distributed to print provider 16 via communication network 32. Thus, print job 12, including job ticket 40 and data file 42, is submitted to print provider 16 through print processing system controller 28. It is, however, within the scope of the present invention for data file 42 to be submitted directly to print provider 16 from user 14.

By interacting with print provider interface 26 and user interface 24, print provider 16 and user 14 register printing capability 36 and generate job ticket 40, respectively. In one exemplary embodiment, print provider interface 26 and user interface 24 each include a plurality of input fields, as described, for example, in above-incorporated U.S. patent application Ser. Nos. 09/685,847 and 09/686,849, with which print provider 16 and user 14 interact to specify attributes of print services 18 and print job 12, respectively. Print provider 16 and/or user 14, however, may register printing capability 36 and generate job ticket 40, respectively, by responding to query-based systems or applications.

Figure 4:
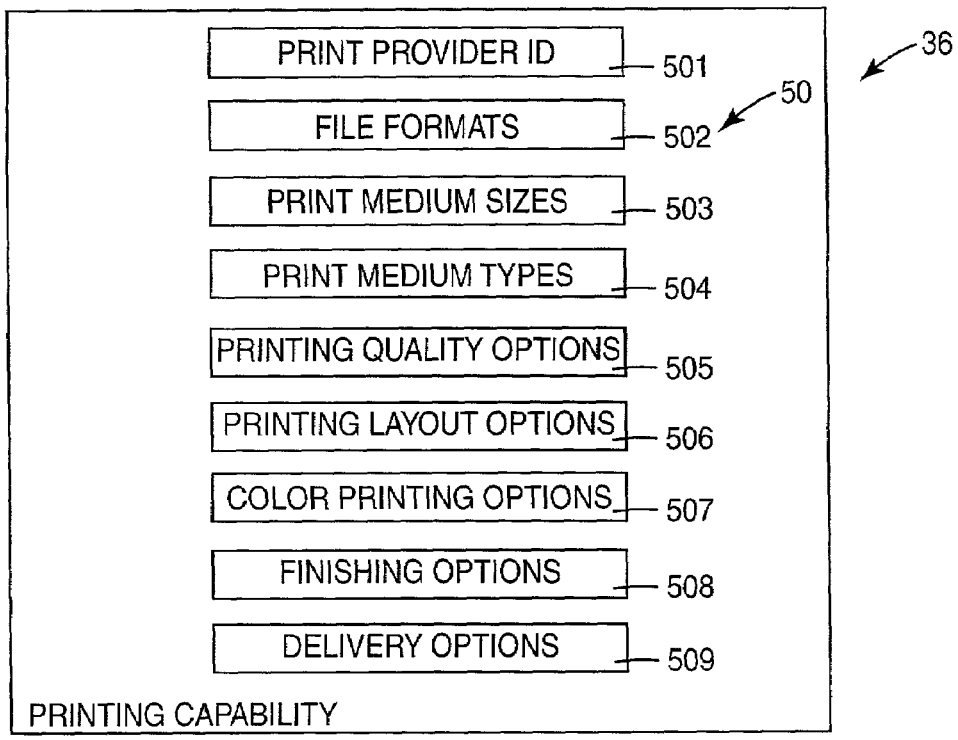
FIG. 4 is a diagram illustrating one exemplary embodiment of print services of a print provider registered with the print processing system of FIG. 1.

In one exemplary embodiment, as illustrated in FIG. 4, printing capability 36 includes a plurality of printing capability attributes 50 which define print services 18. Printing capability attributes 50 coincide with selections as specified by print provider 16 while interacting with print provider interface 26. Printing capability attributes 50, include, for example, a print provider identification attribute 501, a file formats attribute 502, a print medium sizes attribute 503, a print medium types attribute 504, a printing quality options attribute 505, a printing layout options attribute 506, a color printing options attribute 507, a finishing options attribute 508, and a delivery options attribute 509.

Print provider identification attribute 501 includes the name and the address of print provider 16. File formats attribute 502 includes the different file formats that print provider 16 supports and, more specifically, the file formats from which print provider 16 is capable of printing. Print medium sizes attribute 503 includes the different sizes of print medium upon which print provider 16 is capable of printing. Print medium types attribute 504 includes the different types of print medium upon which print provider 16 is capable of printing. Printing quality options attribute 505 includes the different printing qualities that print provider 16 is capable of offering as print services 18. Printing layout options attribute 506 includes the different printing layouts that print provider 16 is capable of providing as print services 18. Color printing options attribute 507 includes the different color printing options that print provider 16 is capable of offering as print services 18. Finishing options attribute 508 includes the different finishing options that print provider 16 is capable of providing as printing services 18. Delivery options attribute 509 includes the different delivery options that print provider 16 is capable of providing as print services 18.

Figure 5:
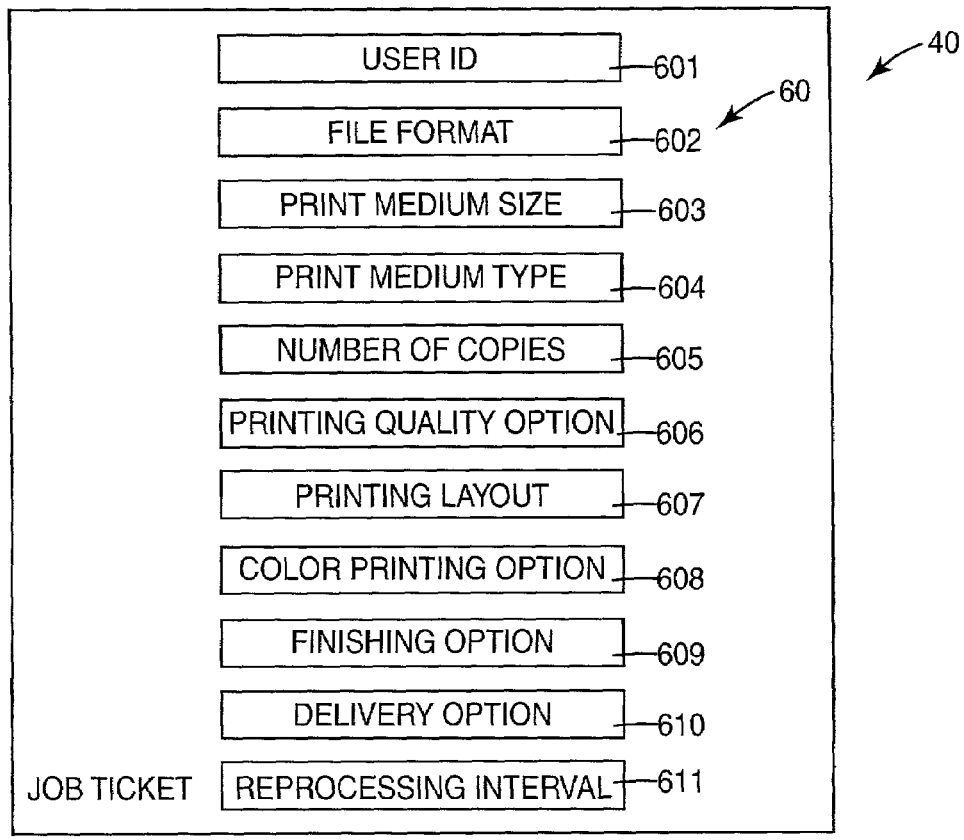
FIG. 5 is a diagram illustrating one exemplary embodiment of a job ticket for a print job received by the print processing system of FIG. 1.

In one exemplary embodiment, as illustrated in FIG. 5, job ticket 40 includes a plurality of job ticket attributes 60 which define print job 12. Job ticket attributes 60 coincide with selections as specified by user 14 while interacting with user interface 24. Job ticket attributes 60 include, for example, a user identification attribute 601, a file format attribute 602, a print medium size attribute 603, a print medium type attribute 604, a number of copies attribute 605, a printing quality option attribute 606, a printing layout attribute 607, a color printing option attribute 608, a finishing option attribute 609, a delivery option attribute 610, and reprocessing interval attribute 611.

User identification attribute 601 includes, for example, the name and the address of user 14. File format attribute 602 includes the format of the file from which print job 12 is to be printed. Print medium size attribute 603 includes a selected or desired size of medium upon which print job 12 is to be printed. Print medium type attribute 604 includes a selected or desired type of medium upon which print job 12 is to be printed. Number of copies attribute 605 includes the number of copies included in print job 12. Printing quality option attribute 606 includes a selected or desired printing quality for print job 12. Printing layout attribute 607 includes a selected or desired layout of how print job 12 is to be printed. Color printing option attribute 608 includes a selected or desired color content for print job 12. Finishing option attribute 609 includes a selected or desired finish to be applied to print job 12. Delivery option attribute 610 includes how and within what time frame print job 12 is to be delivered to user 14. Reprocessing interval attribute 611 includes a selected or desired interval for reprocessing of print job 12, as described below. It is understood that not all attributes need be specified and that additional attributes may be included in job ticket 40.

In one exemplary embodiment, print processing system controller 28 infers or determines a number of job ticket attributes 60 from data file 42 submitted with job ticket 40 for print job 12. Print processing system controller 28 determines, for example, file format attribute 602, print medium size attribute 603, and printing layout attribute 607 of print job 12 from data file 42. User 14, therefore, need only enter those job ticket attributes 60 which are not determined by print processing system controller 28. As such, it is not necessary for user 14 to enter all job ticket attributes 60.

Figure 6:
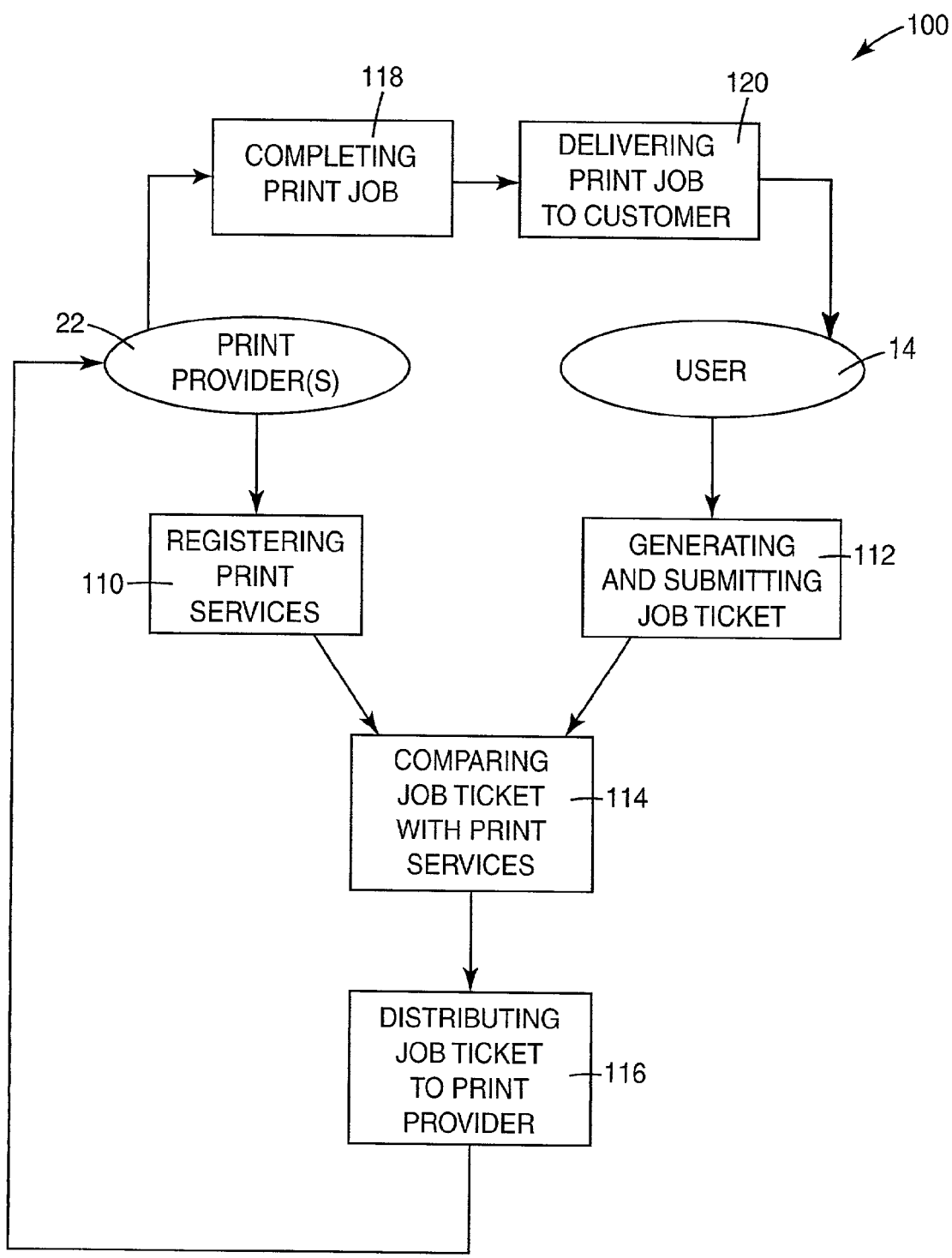
FIG. 6 is a flow diagram illustrating one exemplary embodiment of a method of processing a print job according to the present invention.

In FIG. 6, a flow diagram illustrating one exemplary embodiment of a method of processing print job 12 according to the present invention is illustrated generally at 100. Reference is also made to FIGS. 1–5. At step 110, at least one print provider 16 of the plurality of print providers 22 registers a respective printing capability 36 for print services 18 with print processing system controller 28 and, at step 112, user 14 generates and submits job ticket 40 for print job 12 to print processing system controller 28.

In one exemplary embodiment, data file 42 for print job 12 is associated with job ticket 40 and submitted to print processing system controller 28 in step 112. Print providers 22 register printing capability 36 with print processing system controller 28 via print provider interface 26 and communication network 32, as illustrated in FIG. 2 and described above, and user 14 generates and submits job ticket 40 to print processing system controller 28 via user interface 24 and communication network 32, as illustrated in FIG. 3 and described above.

Preferably, print providers 22 register printing capability 36 at step 110 before user 14 generates and submits job ticket 40 at step 112. It is, however, within the scope of the present invention for print providers 22 to register printing capability 36 after user 14 generates and submits job ticket 40. It is also within the scope of the present invention for print providers 22 to re-register and/or update printing capability 36 in print processing system controller 28. In addition, it is also within the scope of the present invention for user 14 to re-generate and/or re-submit job ticket 40 to print processing system controller 28.

Next, in step 114, after print processing system controller 28 receives job ticket 40, print processing system controller 28 compares job ticket 40 of print job 12 with print services 18, including printing capability 36, of print providers 22 to determine if print provider 16 has print services 18 to fulfill print job 12. To compare job ticket 40 with printing capability 36, job ticket attributes 60 of print job 12, as specified by user 14, are compared with printing capability attributes 50 of print services 18, as provided by print providers 22. Thus, print providers 22 having printing capability 36 to fulfill job ticket 40 and, therefore, complete print job 12 are determined. In one exemplary embodiment, only those print providers 22 which have printing capability 36 to fulfill job ticket 40 are identified in step 114.

When printing capability 36 of print providers 22 is registered with print processing system controller 28 in step 110, print processing system controller 28 stores printing capability 36 in memory device 30, as described above. As such, print processing system controller 28 retrieves printing capability 36 from memory device 30 when comparing job ticket 40 with printing capability 36 in step 114.

Next, in step 116, print processing system controller 28 distributes job ticket 40 for print job 12 to print provider 16 based on print provider 16 having printing capability 36 to fulfill print job 12, as determined in step 114. In one exemplary embodiment, print processing system controller 28 also distributes data file 42 for print job 12 to print provider 16 with job ticket 40.

Then, in step 118, print provider 16 completes print job 12 and, in step 120, delivers completed print job 12 to user 14. Delivery of completed print job 12 to user 14 from print provider 16 is also represented by dashed line 19 in FIG. 3.

By registering printing capability 36 with print processing system controller 28, print providers 22 can optimize use of print services 18. More specifically, by registering and updating printing capability 36 in print processing system controller 28, print providers 22 can receive print jobs 12 requiring their respective print services 18. Thus, print processing system 10 allows print providers 22 to essentially advertise print services 18 to users 20. In addition, by defining communication network 32 between print providers 22 and print processing system controller 28, print jobs 12 can be efficiently and automatically distributed to print providers 22.

Print Job Reprocessing

Figure 7:
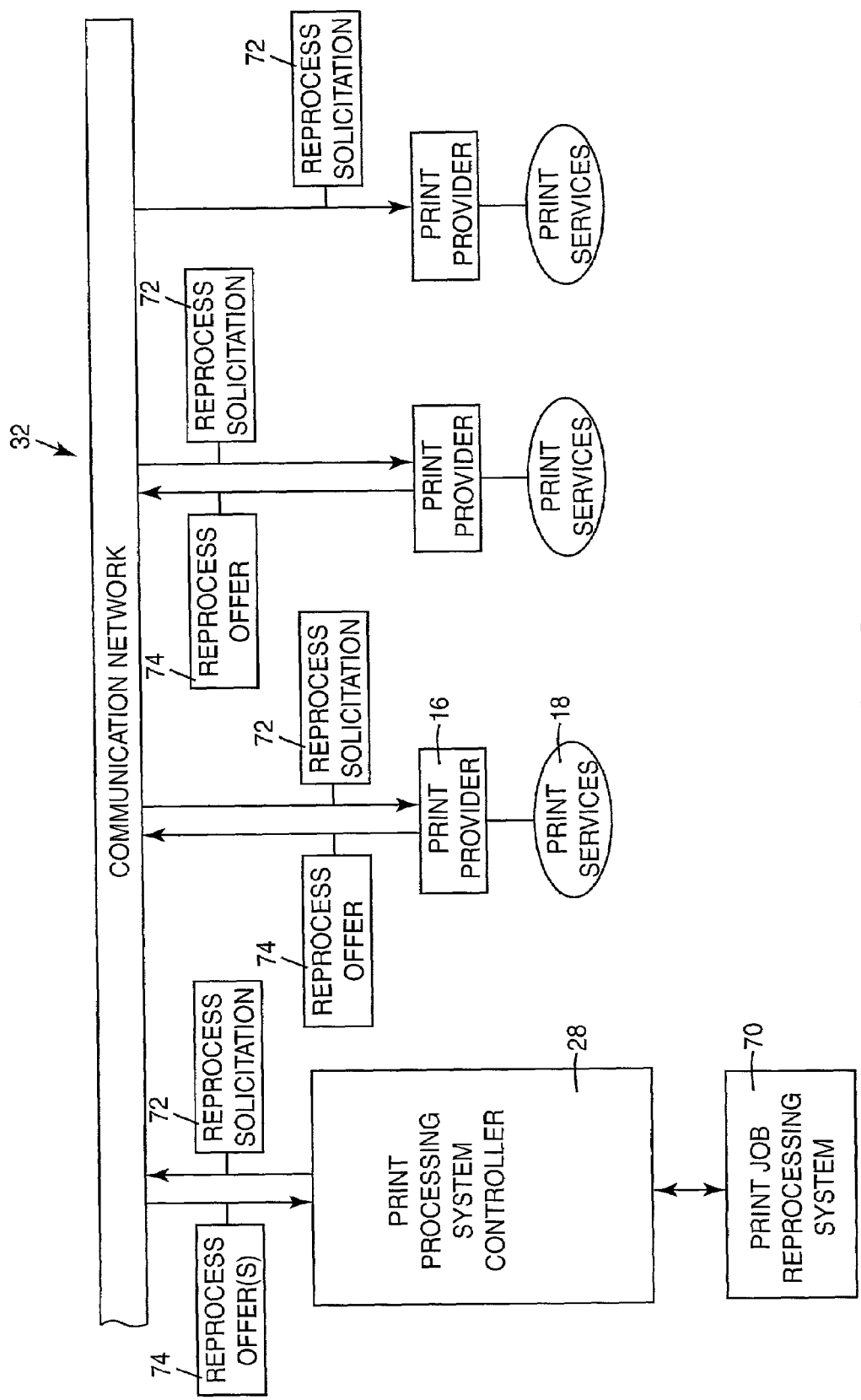
FIG. 7 is a block diagram illustrating one exemplary embodiment of information flow through a portion of the print processing system of FIG. 1 including print job reprocessing according to the present invention.

In one exemplary embodiment, as illustrated in FIG. 7, print processing system 10 includes a print job reprocessing system 70 which facilitates reprocessing of print job 12. More specifically, print job reprocessing system 70 solicits and receives an offer by at least one print provider 16 to reprocess print job 12, after processing of print job 12 as described above, notifies and receives from user 14 an acceptance of the offer to reprocess print job 12, and manages reprocessing of print job 12 accordingly, as described in detail below.

Print job reprocessing system 70 is associated and communicates with print processing system controller 28 and includes hardware, software, firmware, or a combination of these. As such, print job reprocessing system 70 can include a computer server or other microprocessor-based system capable of performing a sequence of logic operations, including reprocessing of print job 12. While print job reprocessing system 70 is illustrated as being separate from print processing system controller 28, it is within the scope of the present invention for print job reprocessing system 70 to be part of print processing system controller 28.

To facilitate reprocessing of print job 12, print job reprocessing system 70 generates a solicitation 72 for an offer to reprocess print job 12 and submits solicitation 72 to one or more print providers 16. As such, after print providers 16 receive solicitation 72, one or more print providers 16 generate an offer 74 to reprocess print job 12 and submit offer 74 to print job reprocessing system 70. It is understood that offer 74 may include one or more offers by print providers 16. In one exemplary embodiment, solicitation 72 for an offer to reprocess print job 12 and offer 74 to reprocess print job 12 are both conveyed between print job reprocessing system 70 and print providers 16 via print processing system controller 28 and communication network 32.

In one exemplary embodiment, solicitation 72 for an offer to reprocess print job 12 includes, for example, job ticket 40 for print job 12 and may also include data file 42 for print job 12. As such, print providers 16 can review or analyze job ticket 40 and/or job ticket 40 and data file 42 in preparation of offer 74 to reprocess print job 12. In addition, each offer 74 to reprocess print job 12 includes, for example, a price for print provider 16 to reprocess print job 12, a lead time or turnaround time for print provider 16 to reprocess print job 12, and/or any other terms or conditions of offer 74.

Preferably, print job reprocessing system 70 submits solicitation 72 to print provider 16 at a predetermined interval. More specifically, print job reprocessing system 70 submits solicitation 72 to print provider 16 at a predetermined interval after processing of print job 12 as described above. In one exemplary embodiment, the predetermined interval for reprocessing of print job 12 is specified with job ticket 40. More specifically, the predetermined interval for reprocessing of print job 12 is identified with reprocessing interval attribute 611 of job ticket attributes 60 as specified with job ticket 40. The predetermined interval for reprocessing of print job 12 is identified, for example, as a number of days or months.

Figure 8:
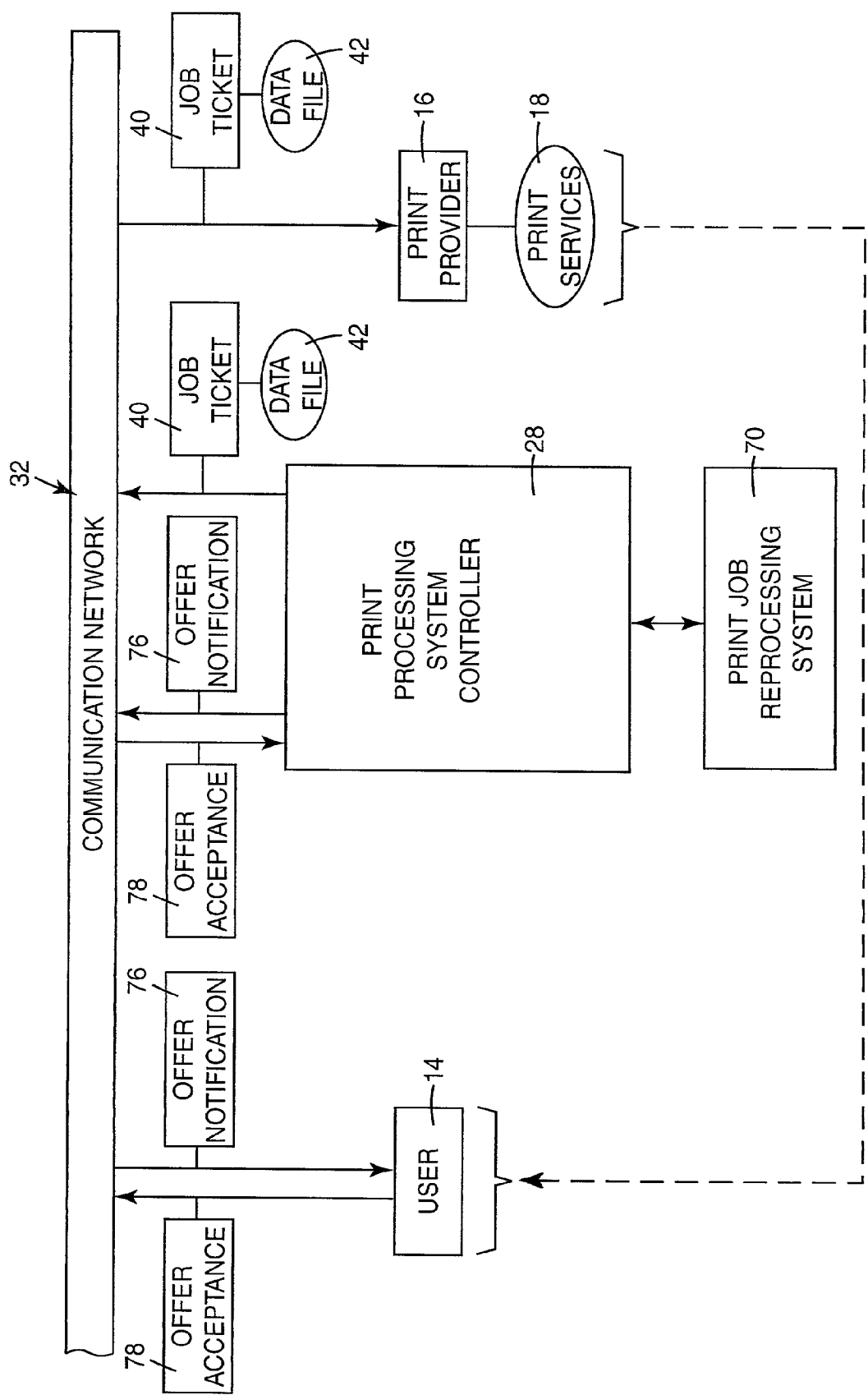
FIG. 8 is a block diagram illustrating another exemplary embodiment of information flow through a portion of the print processing system of FIG. 1 including print job reprocessing according to the present invention.

As illustrated in FIG. 8, print job reprocessing system 70 generates a notification 76 of offer 74 to reprocess print job 12 and distributes notification 76 to user 14. As such, after user 14 receives notification 76 of offer 74 to reprocess print job 12, user 14 determines whether to accept offer 74. Thus, if user 14 decides to accept offer 74 to reprocess print job 12, user 14 submits an acceptance 78 of offer 74 to print job reprocessing system 70.

In one exemplary embodiment, notification 76 of offer 74 to reprocess print job 12 and acceptance 78 of offer 74 are both conveyed between user 14 and print job reprocessing system 70 via print processing system controller 28 and communication network 32. For example, print job reprocessing system 70 distributes notification 76 to user 14 via an electronic mail message generated by print job reprocessing system 70 and/or print processing system controller 28 and transferred to user 14 via communication network 32. As such, notification 76 may include a link or uniform resource locator (URL) to print processing system controller 28 which allows user 14 to view job ticket 40 and submit acceptance 78 via user interface 24. In addition, user 14 may submit acceptance 78 to print job reprocessing system 70 via an electronic mail message transferred to print processing system controller 28 via communication network 32.

In one exemplary embodiment, notification 76 of offer 74 to reprocess print job 12 includes, for example, identification of print provider 16, the price for print provider 16 to reprocess print job 12, the lead time or turnaround time for print provider 16 to reprocess print job 12, and/or any other terms or conditions of offer 74. In one exemplary embodiment, notification 76 of offer 74 to reprocess print job 12 includes confirmation of one of more attributes of print job 12 as specified by job ticket attributes 60 of job ticket 40.

After print job reprocessing system 70 receives acceptance 78 of offer 74 to reprocess print job 12 from user 14, print job reprocessing system 70 initiates redistribution of job ticket 40 and data file 42 for print job 12 to print provider 16 as selected by user 14 with acceptance 78. As such, print processing system controller 28 retrieves job ticket 40 and data file 42 for print job 12 from memory device 30 (FIG. 1) and distributes job ticket 40 and data file 42 to print provider 16 via communication network 32, as described above. Thus, print provider 16 reprocesses print job 12 by processing print job 12, including completing and delivering print job 12, in a manner similar to that described above.

Figure 9:
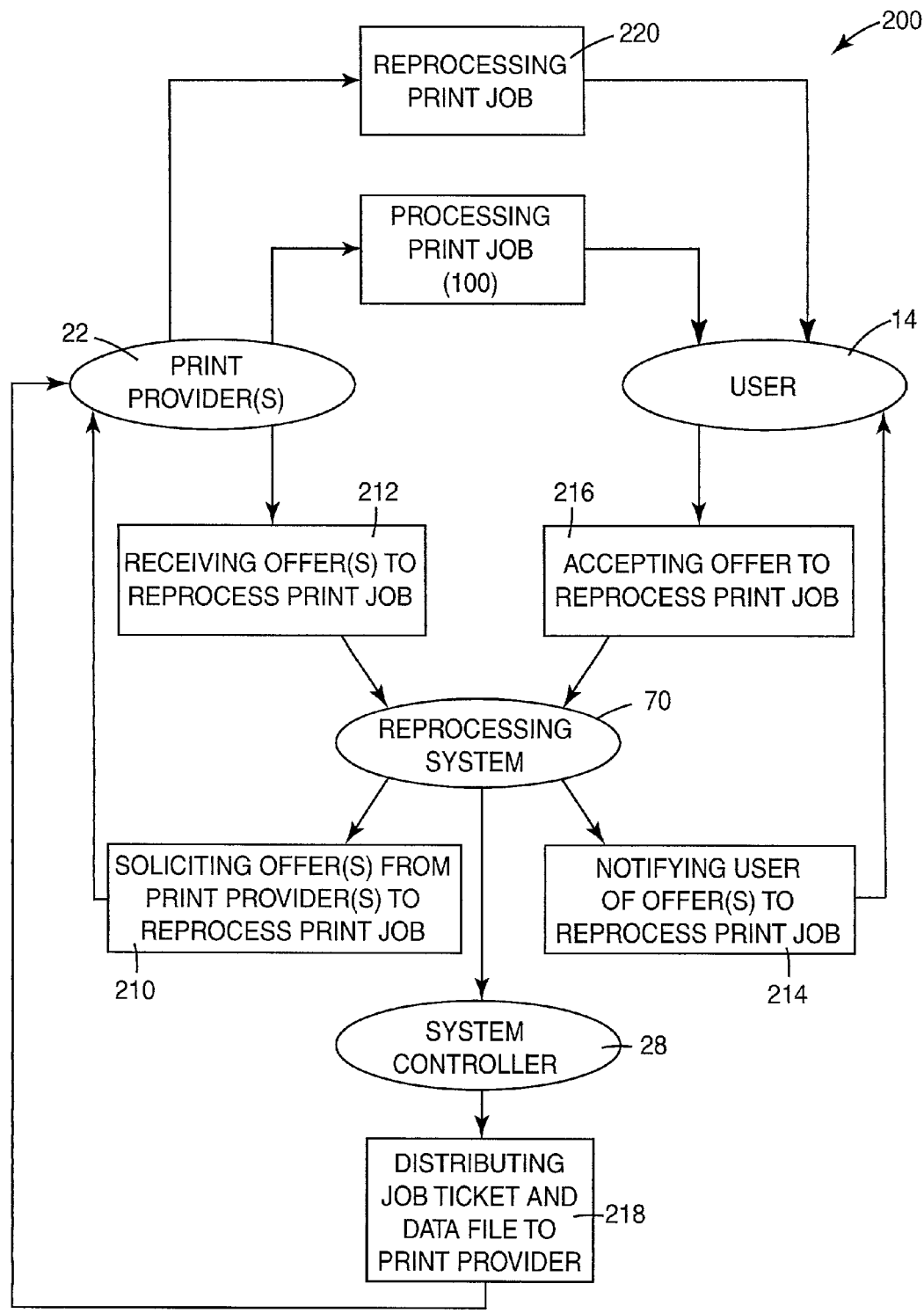
FIG. 9 is a flow diagram illustrating one exemplary embodiment of a method of reprocessing a print job according to the present invention.

In FIG. 9, a flow diagram illustrating one exemplary embodiment of a method of reprocessing print job 12 according to the present invention is illustrated generally at 200. Reference is also made to FIGS. 1–8. Reprocessing of print job 12 in method 200 is performed after processing of print job 12 as described above with reference to method 100 and illustrated, for example, in FIG. 6.

At step 210, an offer to reprocess print job 12 is solicited from print providers 22. In one exemplary embodiment, print job reprocessing system 70 solicits the offer to reprocess print job 12 at a predetermined interval as specified with job ticket 40. As such, print job reprocessing system 70 generates solicitation 72 and distributes solicitation 72 to print providers 22 via communication network 32, as illustrated in FIG. 7 and described above.

Next, at step 212, offer 74 to reprocess print job 12 is received from one or more print providers 22. Offer 74 includes, for example, price, time, and/or any other terms or conditions of offer 74. Print job reprocessing system 70 receives offer 74 from print providers 22 via communication network 32, as illustrated in FIG. 7 and described above.

As such, at step 214, notification 76 of offer 74 to reprocess print job 12 is distributed to user 14. Notification 76 of offer 74 includes, for example, identification of print providers 22, price or timing of reprocessing print job 12, and/or any other terms or conditions of offer 74. In addition, in one exemplary embodiment, notification 76 includes confirmation of one or more attributes of print job 12. Print job reprocessing system 70 distributes notification 76 to user 14 via communication network 32, as illustrated in FIG. 8 and described above.

Next, at step 216, acceptance 78 of offer 74 to reprocess print job 12 is received from user 14. Print job reprocessing system 70 receives acceptance 78 from user 14 via communication network 32, as illustrated in FIG. 8 and described above.

At step 218, after print job reprocessing system 70 receives acceptance 78 of offer 74 to reprocess print job 12, print processing system controller 28 distributes job ticket 40 and data file 42 for print job 12 to print provider 16 as identified in acceptance 78. As such, print processing system controller 28 retrieves job ticket 40 and data file 42 for print job 12 from memory device 30, as described above. Print processing system controller 28 distributes job ticket 40 and data file 42 to print provider 16 via communication network 32, as illustrated in FIG. 8 and described above.

At step 220, print provider 16 reprocesses print job 12 by processing print job 12 in a manner similar to that described above and outlined in method 100. As such, print provider 16 completes print job 12 and delivers completed print job 12 to user 14.

By soliciting and receiving offer 74 from one or more print providers 22 to reprocess print job 12 and notifying user 14 of offer 74, print processing system 10 and, more specifically, print job reprocessing system 70 automatically initiates reprocessing of print job 12. In addition, by receiving from user 14 acceptance 78 of offer 74 to reprocess print job 12, print processing system 10, including print job reprocessing system 70, automatically manages reprocessing of print job 12 by distributing job ticket 40 and data file 42 for print job 12 to print provider 16. Thus, print job reprocessing system 70 allows print providers 22 to generate repeat business with users 20 while recognizing and honoring the established relationship between a print provider and a user.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of reprocessing a print job of a user, the method comprising:
    processing of the print job by one of a plurality of print providers based on a job ticket and a data file for the print job;
    soliciting the plurality of print providers, including the one of the plurality of print providers, with a print processing system controller and receiving at the print processing system controller an offer by at least one of the print providers to reprocess the print job; and
    notifying the user of the offer by the at least one of the print providers to reprocess the print job with the print processing system controller.

2. The method of claim 1, wherein processing of the print job includes identifying a predetermined interval for reprocessing of the print job, and wherein soliciting the offer by the at least one of the print providers includes soliciting the offer by the at least one of the print providers at the predetermined interval.

3. The method of claim 2, further comprising:
    receiving the job ticket and the data file for the print job at the print processing system controller, including specifying the predetermined interval for reprocessing of the print job.

4. The method of claim 1, wherein notifying the user of the offer by the at least one of the print providers includes confirming at least one attribute of the print job.

5. The method of claim 1, further comprising:
    receiving from the user at the print processing system controller an acceptance of the offer by the at least one of the print providers to reprocess the print job; and
    reprocessing of the print job by the at least one of the print providers based on the job ticket and the data file for the print job.

6. The method of claim 5, further comprising:
    storing the job ticket and the data file for the print job, wherein reprocessing of the print job by the at least one of the print providers includes retrieving the job ticket and the data file for the print job.

7. The method of claim 5, further comprising:
    registering print services of the at least one of the print providers with the print processing system controller, wherein reprocessing of the print job by the at least one of the print providers includes processing the print job with the print services of the at least one of the print providers.

8. The method of claim 7, further comprising:
    linking the user and the print processing system controller via a communication network,
    wherein notifying the user of the offer by the at least one of the print providers includes notifying the user of the offer via the communication network.

9. The method of claim 8, wherein receiving from the user the acceptance of the offer includes receiving from the user the acceptance of the offer via the communication network.

10. The method of claim 8, further comprising:
    receiving the job ticket and the data file for the print job from the user at the print processing system controller via the communication network.

11. The method of claim 7, further comprising:
    linking the at least one of the print providers and the print processing system controller via a communication network,
    wherein soliciting and receiving the offer by the at least one of the print providers includes soliciting and receiving the offer by the at least one of the print providers via the communication network.

* * * * *